(12) United States Patent
Shveidel et al.

(10) Patent No.: US 11,003,554 B2
(45) Date of Patent: May 11, 2021

(54) RAID SCHEMA FOR PROVIDING METADATA PROTECTION IN A DATA STORAGE SYSTEM

(71) Applicant: EMC IP Holding Company LLC, Hopkinton, MA (US)

(72) Inventors: Vladimir Shveidel, Pardes-Hana (IL); Uri Shabi, Tel Mond (IL); Ronen Gazit, Tel Aviv (IL); Alex Soukhman, Raanana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 162 days.

(21) Appl. No.: 16/393,358

(22) Filed: Apr. 24, 2019

(65) Prior Publication Data
US 2020/0341871 A1 Oct. 29, 2020

(51) Int. Cl.
*G06F 11/20* (2006.01)
(52) U.S. Cl.
CPC ...... *G06F 11/2064* (2013.01); *G06F 11/2058* (2013.01); *G06F 11/2074* (2013.01); *G06F 11/2082* (2013.01); *G06F 2201/82* (2013.01)
(58) Field of Classification Search
CPC ............. G06F 11/2058; G06F 11/2064; G06F 2201/82; G06F 11/2038; G06F 11/2041; G06F 11/2074; G06F 11/2082
See application file for complete search history.

(56) References Cited

U.S. PATENT DOCUMENTS

| | | | |
|---|---|---|---|
| 8,095,577 B1 | 1/2012 | Faibish et al. | |
| 8,438,135 B1 | 5/2013 | Natanzon et al. | |
| 9,558,068 B1 | 1/2017 | Bono et al. | |
| 10,001,927 B1 | 6/2018 | Trachtman et al. | |
| 10,146,456 B1 | 12/2018 | Gao et al. | |
| 2003/0135703 A1* | 7/2003 | Martin | G06F 11/1471 711/162 |
| 2003/0177145 A1* | 9/2003 | Lohn | G06F 11/1469 |
| 2017/0024295 A1* | 1/2017 | Klughart | G06F 11/2069 |
| 2019/0340082 A1* | 11/2019 | Pradhan | G06F 16/27 |

* cited by examiner

*Primary Examiner* — Bryce P Bonzo
*Assistant Examiner* — Albert Li
(74) *Attorney, Agent, or Firm* — BainwoodHuang

(57) ABSTRACT

Techniques for providing metadata (and/or data) protection in a data storage system. The techniques can include storing, for a specific data page, two (2) instances of a main metadata page and one (1) instance of a corresponding alternative metadata page in a protected storage object referred to herein as the "2+1-way mirror". For the specific data page, two (2) instances of a main metadata page can be stored on a first drive and a second drive, respectively, of the 2+1-way mirror such that the first and second drives each have a copy of the same main metadata page. Further, an instance of a corresponding alternative metadata page can be stored on a third drive of the 2+1-way mirror. The 2+1-way mirror provides protection against metadata loss due to the concurrent failure of two (2) physical drives, and further provides protection against catastrophic metadata errors and/or inconsistencies due to software failures.

18 Claims, 3 Drawing Sheets

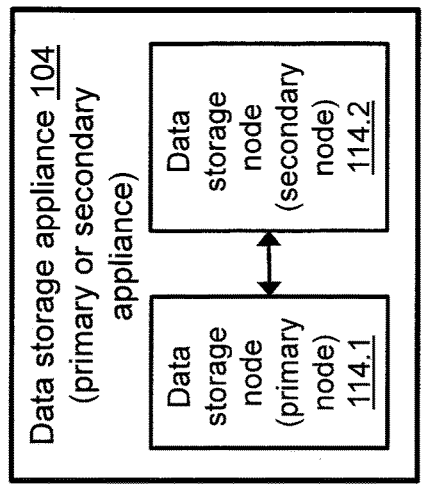
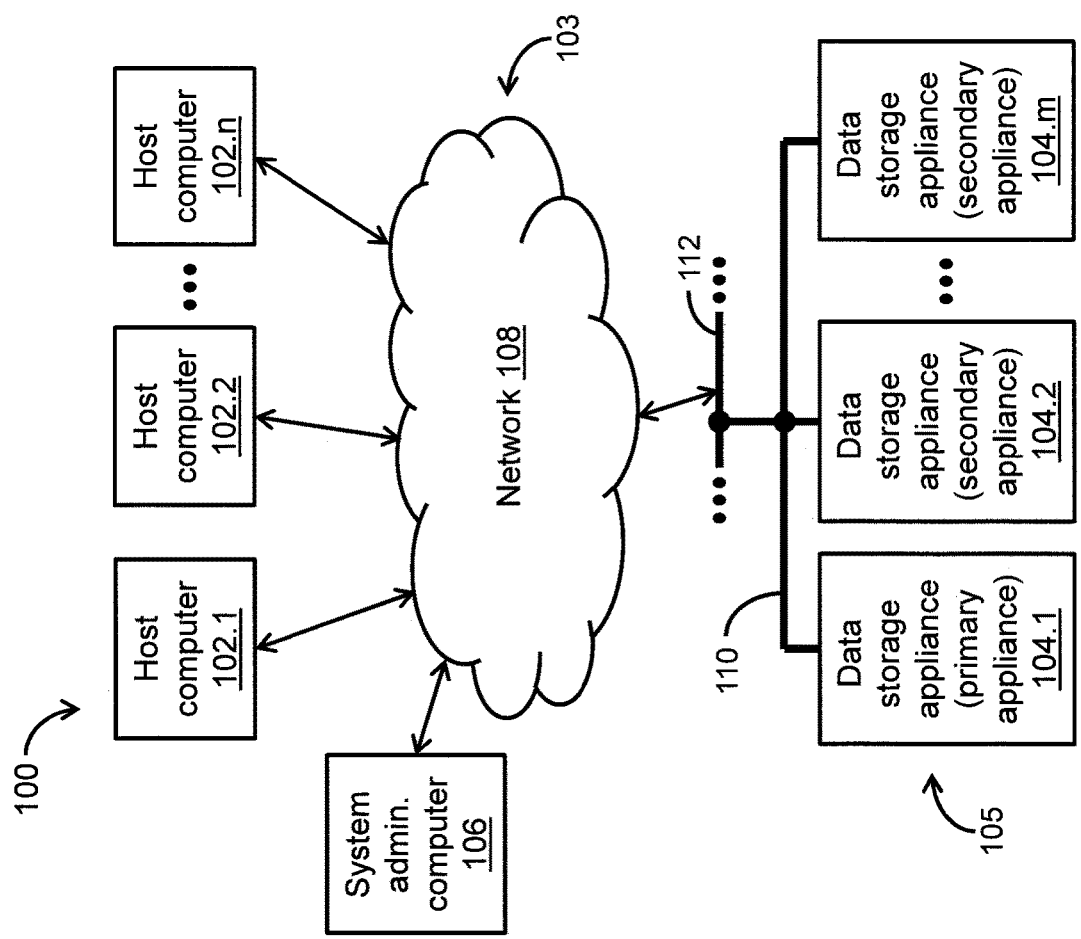

RAID SCHEMA FOR PROVIDING METADATA PROTECTION IN A DATA STORAGE SYSTEM

BACKGROUND

Data storage systems include storage processors coupled to arrays of physical non-volatile storage devices (referred to herein as the "physical drives"), such as magnetic disk drives, electronic flash drives, and/or optical drives. The storage processors are configured to service storage input/output (IO) requests received from host computers, which typically send the storage IO requests to the data storage systems over one or more networks. The storage IO requests specify data pages, data files, and/or any other suitable data elements to be written to, read from, created on, and/or deleted from data volumes, file systems, and/or any other suitable storage objects on the physical drives. Computer software application programs running on the storage processors are configured to manage the received storage IO requests, and to perform various data processing tasks to organize and/or secure the data elements and/or storage objects on the physical drives.

SUMMARY

Data storage systems employ various techniques to assure high availability in the event of hardware and/or software failures. For example, a hardware failure may correspond to the failure of one or more physical drives of a data storage system. To protect against possible data (and/or metadata) loss due to a physical drive failure(s), the data storage system can be configured such that at least some its physical drives belong to a redundant array of independent (or inexpensive) disks (RAID) group, which is a storage device array created by logically binding together a set of physical drives. Such a RAID group can represent a logically contiguous address space distributed across a set of physical drives. Further, different RAID levels (e.g., RAID-5, RAID-6) can be employed to provide varying degrees of fault tolerance for physical drive failures within the RAID group. For example, a RAID-5 level group may protect against data (and/or metadata) loss due to the failure of a single physical drive in the RAID group, and a RAID-6 level group may protect against data (and/or metadata) loss due to the concurrent failure of two (2) physical drives in the RAID group. It is noted that the terms "storage device(s)", "drive(s)", and "disk(s)" are employed herein interchangeably, even though it is well known that not all physical storage devices or drives include rotating disks.

Because metadata pages are frequently stored at fixed address locations and therefore written or updated "in-place" to storage objects on a physical drive, a data storage system can include a 3-way mirror for storing metadata (and/or data). For example, a 3-way mirror may be configured to include a primary drive, a secondary drive, and a tertiary drive. Further, each metadata page may be written or updated in-place on each of the primary drive, the secondary drive, and the tertiary drive such that the respective drives each have a mirrored copy of the same metadata page. It is noted that such a 3-way mirror can provide a degree of fault tolerance commensurate with a RAID-6 level group, providing protection against metadata (and/or data) loss due to the concurrent failure of two (2) physical drives.

Software failures in data storage systems can be caused by software "bugs", buffer overruns, invalid pointers, and so on. For example, a software failure may cause metadata associated with a data page to be erased or fail to update correctly in response to changes in the content of the data page, potentially resulting in catastrophic metadata errors and/or inconsistencies that prevent access to the data page content. To avoid such catastrophic metadata errors/inconsistencies, a metadata page associated with the data page can be stored as a main metadata (MMD) page on a data storage system, and a corresponding metadata page can be stored as an alternative metadata (AMD) page on the data storage system such that the AMD page is logically independent of the MMD page. Such an AMD page can correspond to a non-redundant metadata page that lags behind the MMD page by a specified time interval. Further, any changes made to the metadata of the MMD page during the specified time interval can be maintained in a delta-log, which can be periodically merged with the AMD page to obtain an effective logical equivalent of the MMD page. Moreover, in the event the MMD page becomes lost or corrupted (e.g., due to a software failure), the delta-log can be merged with the AMD page to reconstruct the MMD page.

In sum, a data storage system can protect against (i) data and/or metadata loss due to the concurrent failure of two (2) physical drives by employing a RAID-6 level group or 3-way mirror, and (ii) catastrophic metadata errors and/or inconsistencies due to software failures by employing, for each data page, a main metadata (MMD) page and a corresponding logically independent alternative metadata (AMD) page (and its associated delta-log). For example, to protect against possible metadata loss and/or catastrophic metadata errors/inconsistencies, three (3) copies of each MMD page may be stored on a 3-way mirror configuration of physical drives, and one (1) copy of each corresponding AMD page may be stored logically independent of the MMD page.

However, storing three (3) copies of each main metadata (MMD) page on a 3-way mirror while maintaining one (1) copy of each corresponding logically independent alternative metadata (AMD) page not only wastes capacity of a data storage system, but also results in metadata write amplification, which can reduce throughput, increase latency, and/or increase wear on physical drives used to store the metadata. As employed herein, the term "metadata write amplification" refers to the number of metadata write operations needed per data write operation (in this case, three (3) for each MMD page stored on the 3-way mirror, and one (1) for each corresponding logically independent AMD page, totaling four (4) metadata write operations per data write operation). It is noted that physical drives for storing metadata can be the most expensive physical media in a data storage system, and therefore increased wear on such physical drives can lead to increased costs. Moreover, the replacement of worn metadata physical media can be a complex task, potentially resulting in undesirable disruptions to the availability of a data storage system.

Techniques are disclosed herein for providing metadata (and/or data) protection in a data storage system that can protect against (i) metadata (and/or data) loss due to the concurrent failure of two (2) of the data storage system's physical drives, and/or (ii) catastrophic metadata errors and/or inconsistencies due to software failures, while reducing storage utilization and therefore write amplification in the physical drives. The disclosed techniques can include storing, for each data page, two (2) instances of a main metadata (MMD) page and one (1) instance of a corresponding alternative metadata (AMD) page in a protected storage object referred to herein as the "2+1-way mirror". The 2+1-way mirror can be configured such that, for each data page, two (2) instances of an MMD page and one (1) instance of a corresponding AMD page are stored on three (3) different and distinct physical drives of the data storage system. For example, a first instance and a second instance of an MMD page may be stored on a first drive and a second drive, respectively, of the 2+1-way mirror such that the first and second drives each have a mirrored copy of the same MMD page. Further, an instance of a corresponding AMD page may be stored on a third drive of the 2+1-way mirror such that the corresponding AMD page is logically independent of each mirrored copy of the MMD page stored on the respective first and second drives.

Because, in the disclosed techniques, a delta-log can be periodically merged with each alternative metadata (AMD) page to obtain (or reconstruct) an effective logical equivalent of its corresponding main metadata (MMD) page, the 2+1-way mirror effectively provides 3-way mirroring of each MMD page, allowing protection against metadata loss due to the concurrent failure of two (2) physical drives. Further, because each AMD page is logically independent of its corresponding MMD page, the 2+1-way mirror allows protection against catastrophic errors and/or inconsistencies in each MMD page due to software failures. In addition, the number of metadata write operations needed per data write operation (in this case, two (2) for each MMD page and one (1) for each corresponding AMD page, totaling three (3) metadata write operations per data write operation) is reduced.

In certain embodiments, a method of providing metadata protection in a data storage system includes writing a first instance of a main metadata page of a data volume to a first physical drive of a storage drive array, writing a second instance of the main metadata page to a second physical drive of the storage drive array, and writing an instance of an alternative metadata page of the data volume to a third physical drive of the storage drive array. In these embodiments, values of the alternative metadata page lag corresponding values of the main metadata page by a specified time interval, and changes to the main metadata page that occur during the specified time interval are maintained in a delta-log. Further, in these embodiments, the method includes configuring the first instance of the main metadata page on the first physical drive, the second instance of the main metadata page on the second physical drive, and the instance of the alternative metadata page on the third physical drive of the storage drive array to function as a protected storage object.

In certain arrangements, the method includes servicing a write request to write a specified data page to the data volume, including writing the first instance of the main metadata page to the first physical drive, and writing the second instance of the main metadata page to the second physical drive.

In certain arrangements, the method includes periodically merging the changes to the main metadata page maintained in the delta-log with the alternative metadata page on the third physical drive to obtain a logical equivalent of the main metadata page.

In certain arrangements, the method includes updating the instance of the alternative metadata page on the third physical drive using the logical equivalent of the main metadata page.

In certain arrangements, the method includes, in response to a failure of a respective physical drive among the first physical drive and the second physical drive, copying the main metadata page on an active physical drive among the first physical drive and the second physical drive to a fourth physical drive of the storage drive array, and assigning the fourth physical drive to function as the respective physical drive that has the failure.

In certain arrangements, the method includes, in response to a failure of the third physical drive, copying the main metadata page on one of the first physical drive and the second physical drive to a fourth physical drive of the storage drive array, and assigning the fourth physical drive to function as the third physical drive.

In certain arrangements, the method includes notifying a mapping layer of the data storage system that the copied main metadata page on the fourth physical drive is identical to the main metadata page on the first physical drive.

In certain arrangements, the method includes, in response to concurrent failures of the first physical drive and the second physical drive, merging the changes to the main metadata page maintained in the delta-log with the alternative metadata page on the third physical drive to obtain a logical equivalent of the main metadata page, and writing the logical equivalent of the main metadata page to each of a fourth physical drive and a fifth physical drive of the storage drive array.

In certain arrangements, the method includes assigning the fourth physical drive and the fifth physical drive to function as the first physical drive and the second physical drive, respectively.

In certain arrangements, the method includes, in response to concurrent failures of (i) a respective physical drive among the first physical drive and the second physical drive, and (ii) the third physical drive, copying the main metadata page on an active physical drive among the first physical drive and the second physical drive to each of a fourth physical drive and a fifth physical drive of the storage drive array, assigning the fourth physical drive to function as the respective physical drive that has the failure, and assigning the fifth physical drive to function as the third physical drive.

In certain arrangements, the method includes notifying a mapping layer of the data storage system that the copied main metadata page on the fifth physical drive is identical to the main metadata page on the active physical drive among the first and second physical drives.

In certain arrangements, the method includes, in response to an error or inconsistency in the main metadata page on one or more of the first physical drive and the second physical drive, merging the changes to the main metadata page maintained in the delta-log with the alternative metadata page on the third physical drive to obtain a logical equivalent of the main metadata page, and reconstructing the main metadata page using the logical equivalent of the main metadata page.

In certain embodiments, a 2+1-way mirror for providing metadata protection in a data storage system includes at least a first physical drive, a second physical drive, and a third physical drive of a storage drive array. In these embodiments, the first physical drive is configured to store a first instance of a main metadata page of a data volume, the second physical drive is configured to store a second instance of the main metadata page of the data volume, and the third physical drive is configured to store an instance of an alternative metadata page of the data volume. Further, in these embodiments, values of the alternative metadata page lag corresponding values of the main metadata page by a specified time interval, and changes to the main metadata page that occur during the specified time interval are maintained in a delta-log.

In certain arrangements, the first physical drive, the second physical drive, and the third physical drive correspond to three (3) different and distinct physical drives of the storage drive array.

In certain arrangements, the instance of the alternative metadata page stored on the third physical drive is logically independent of each of the first instance of the main metadata page stored on the first physical drive, and the second instance of the main metadata page stored on the second physical drive.

In certain embodiments, a computer program product includes a set of non-transitory, computer-readable media having instructions that, when executed by control circuitry of a computerized apparatus, cause the control circuitry to perform a method of providing metadata protection in a data storage system. In these embodiments, the method includes writing a first instance of a main metadata page of a data volume to a first physical drive of a storage drive array, writing a second instance of the main metadata page to a second physical drive of the storage drive array, and writing an instance of an alternative metadata page of the data volume to a third physical drive of the storage drive array. Further, in these embodiments, values of the alternative metadata page lag corresponding values of the main metadata page by a specified time interval, and changes to the main metadata page that occur during the specified time interval are maintained in a delta-log. Still further, in these embodiments, the method includes configuring the first instance of the main metadata page on the first physical drive, the second instance of the main metadata page on the second physical drive, and the instance of the alternative metadata page on the third physical drive of the storage drive array to function as a protected storage object.

Other functions and aspects of the claimed features of this disclosure will be evident from the Detailed Description that follows.

BRIEF DESCRIPTION OF THE DRAWINGS

The foregoing and other objects, features, and advantages will be apparent from the following description of particular embodiments of the disclosure, as illustrated in the accompanying drawings, in which like reference characters refer to the same parts throughout the different views.

FIG. 1a is a block diagram of an exemplary clustered storage environment, in which techniques may be practiced for providing metadata (and/or data) protection in a data storage system;

FIG. 1b is a block diagram of an exemplary data storage appliance included in the clustered storage environment of FIG. 1a;

DETAILED DESCRIPTION

Figure 1D:
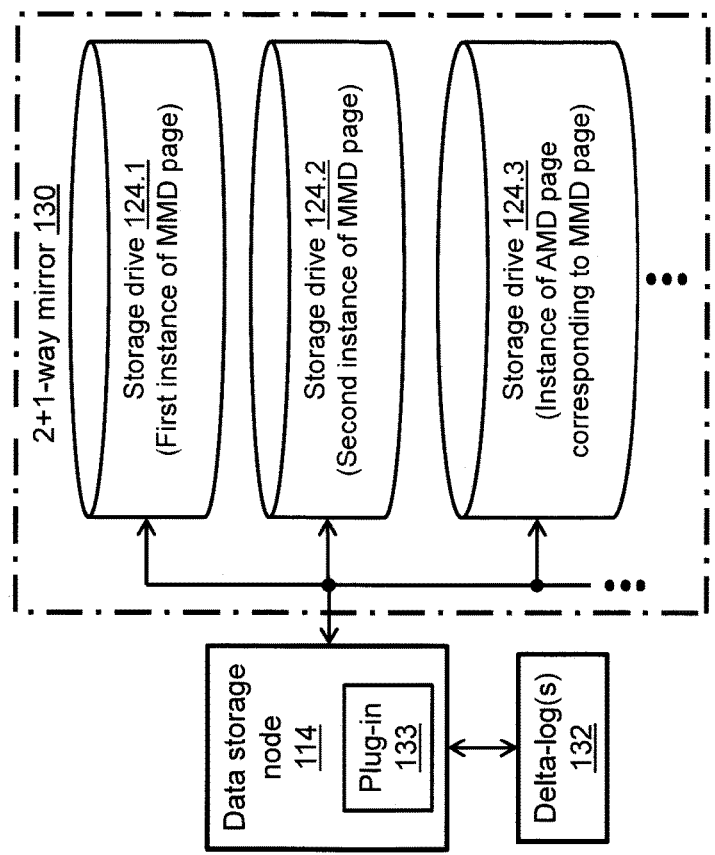
FIG. 1d is a block diagram of an exemplary protected storage object (referred to herein as the "2+1-way mirror") implemented in the storage drive array of FIG. 1c, in which the 2+1-way mirror is employed in conjunction with the data storage node of FIG. 1c and one or more delta-logs.

Techniques are disclosed herein for providing metadata (and/or data) protection in a data storage system. The disclosed techniques can include storing, for a specific data page, two (2) instances of a main metadata (MMD) page and one (1) instance of a corresponding alternative metadata (AMD) page in a protected storage object referred to herein as the "2+1-way mirror". For the specific data page, two (2) instances of an MMD page can be stored on a first drive and a second drive, respectively, of the 2+1-way mirror such that the first and second drives each have a copy of the same MMD page. Further, an instance of a corresponding AMD page can be stored on a third drive of the 2+1-way mirror. The 2+1-way mirror can provide protection against metadata loss due to the concurrent failure of two (2) physical drives, and further provide protection against catastrophic metadata errors and/or inconsistencies due to software failures.

FIG. 1 depicts an illustrative embodiment of an exemplary clustered storage environment 100, in which techniques may be practiced for providing metadata (and/or data) protection in a data storage system. As shown in FIG. 1a, the clustered storage environment 100 can include a plurality of host computers 102.1, 102.2, . . . , 102.n, at least one storage domain 105, and a system administrator computer 106, which are interconnected by a communications medium 103 that includes at least one network 108. For example, each of the plurality of host computers 102.1, . . . , 102.n may be configured as a web server computer, a file server computer, an email server computer, an enterprise server computer, or any other suitable client or server computer or computerized device. Further, the system administrator computer 106 may be remote from (or local to) the storage domain 105 within the clustered storage environment 100.

As further shown in FIG. 1a, the storage domain 105 can include, as members of the storage domain 105, a plurality of data storage appliances 104.1, 104.2, . . . , 104.m. In the storage domain 105, the data storage appliance 104.1 can be elected or otherwise designated to perform (at least temporarily) a role of a primary storage appliance, while each of the remaining data storage appliances 104.2, . . . , 104.m perform (at least temporarily) a role of a secondary storage appliance. The storage domain 105 can further include a local area network (LAN) 110 such as an Ethernet network or any other suitable network, which is configured to interconnect the plurality of data storage appliances 104.1, . . . , 104.m. A plurality of LANs (like the LAN 110) included in a plurality of storage domains (like the storage domain 105) can be interconnected by a network 112, such as a metropolitan area network (MAN), a wide area network (WAN), or any other suitable network.

Within the clustered storage environment 100 of FIG. 1a, the system administrator computer 106 can be configured to execute program instructions to enable a system administrator or other user to define and/or configure the storage domain 105. Further, the plurality of host computers 102.1, . . . , 102.n can be configured to provide, over the network 108, storage input/output (IO) requests (e.g., small computer system interface (SCSI) commands, network file system (NFS) commands) to the respective storage appliances (primary or secondary) 104.1, . . . , 104.m of the storage domain 105. For example, such storage JO requests (e.g., write requests, read requests) may direct the respective storage appliances (primary or secondary) 104.1, . . . , 104.m to write and/or read data pages, data files, and/or any other suitable data elements to/from data volumes (e.g., virtual volumes (VVOLs)), file systems, and/or any other suitable storage objects stored in association with the respective storage appliances 104.1, . . . , 104.m.

The communications medium 103 can be configured to interconnect the plurality of host computers 102.1, ..., 102.n with the respective storage appliances 104.1, ..., 104.m of the storage domain 105 to enable them to communicate and exchange data and/or control signaling. As shown in FIG. 1a, the communications medium 103 is illustrated as a "cloud" to represent a variety of different communications topologies such as a backbone topology, a hub-and-spoke topology, a loop topology, an irregular topology, or any suitable combination thereof. As such, the communications medium 103 can include copper-based data communications devices and cabling, fiber optic devices and cabling, wireless devices, or any suitable combination thereof. Further, the communications medium 103 can be configured to support storage area network (SAN)-based communications, network attached storage (NAS)-based communications, LAN-based communications, MAN-based communications, WAN-based communications, wireless communications, distributed infrastructure communications, and/or any other suitable wired, wireless, or fiber communications.

FIG. 1b depicts an illustrative embodiment of an exemplary data storage appliance 104 included in the storage domain 105 of FIG. 1a. It is noted that each of the data storage appliances (primary or secondary) 104.1, ..., 104.m included in the storage domain 105 can be configured like the data storage appliance 104 of FIG. 1b. As shown in FIG. 1b, the data storage appliance 104 can include two data storage nodes 114.1, 114.2 for providing high availability within the clustered storage environment 100. In the data storage appliance 104, the data storage node 114.1 can be elected or otherwise designated to perform (at least temporarily) a role of a primary storage node, while the data storage node 114.2 performs (at least temporarily) a role of a secondary storage node. For example, the data storage node (primary) 114.1 may (i) receive storage IO requests (e.g., write requests, read requests) from one or more of the host computers 102.1, ..., 102.n over the network 108, (ii) in response to the storage JO requests, write and/or read data pages, data files, and/or any other suitable data elements to/from one or more VVOLs, file systems, and/or any other suitable storage objects stored in association with the data storage node (primary) 114.1, and (iii) at least at certain time intervals, synchronize data stored in association with the data storage node (primary) 114.1 with corresponding data stored in association with the data storage node (secondary) 114.2. In the event of a failure of the data storage node (primary) 114.1, the data storage node (secondary) 114.2 can assume the role of the primary storage node, providing high availability within the clustered storage environment 100.

Figure 1C:
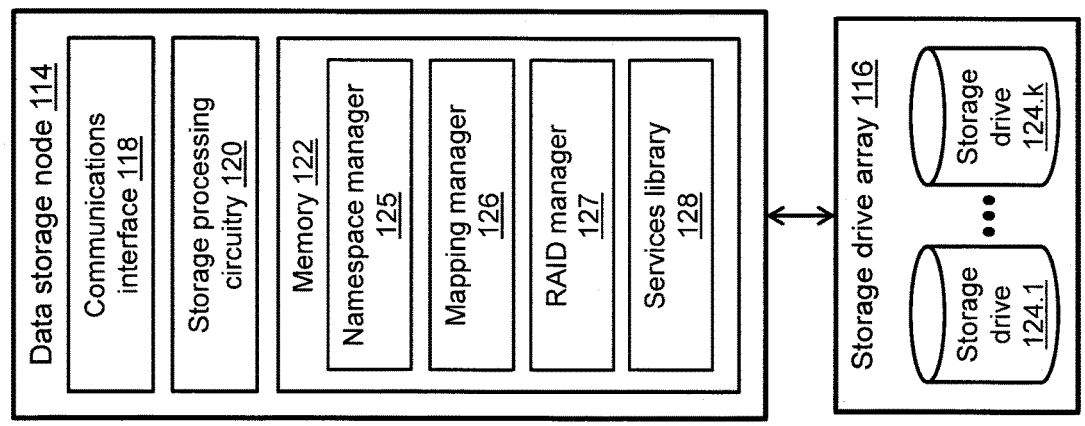
FIG. 1c is a block diagram of an exemplary data storage node included in the data storage appliance of FIG. 1b, as well as an exemplary storage drive array.

FIG. 1c depicts an illustrative embodiment of an exemplary data storage node 114 included in the data storage appliance 104 of FIG. 1b. It is noted that each of the data storage nodes (primary and secondary) 114.1, 114.2 of FIG. 1b can be configured like the data storage node 114 of FIG. 1c. As shown in FIG. 1c, the data storage node 114 can include a communications interface 118, storage processing circuitry 120, and a memory 122. The communications interface 118 can include SCSI target adapters, network interface adapters, and/or any other suitable adapters for converting electronic, wireless, and/or optical signals received over the network 108 to a form suitable for use by the storage processing circuitry 120. The memory 122 can include persistent memory (e.g., flash memory, magnetic memory) and non-persistent memory (e.g., dynamic random access memory (DRAM), static random access memory (SRAM)), and can accommodate a variety of specialized software constructs, including, but not limited to, namespace management code and data (referred to herein as the "namespace manager"; see FIG. 1c, reference numeral 125), mapping management code and data (referred to herein as the "mapping manager"; see FIG. 1c, reference numeral 126), RAID management code and data (referred to herein as the "RAID manager"; see FIG. 1c, reference numeral 127), a services library 128, one or more plug-ins (see FIG. 1d, reference numeral 133), and/or any other suitable software constructs.

The namespace manager 125 can be configured to maintain a namespace of storage objects, such as volumes (e.g., VVOLs), file systems, and/or any other suitable storage objects, accessible to the plurality of host computers 102.1, ..., 102.n. In general, a namespace is a point-in-time (PIT) logical collection of such storage objects, each of which can be represented by an index node (referred to herein as an "inode"). In one embodiment, the namespace maintained by the namespace manager 125 can include a set of storage objects (e.g., VVOLs) organized as a collection of inodes. For example, a VVOL may be made up of one or more extents, each of which may correspond to a range of storage sizes in a logical address space. Further, the range of storage sizes may correspond to a range of contiguous or noncontiguous logical addresses spanning some or all of the VVOL.

The mapping manager 126 can be configured, in a mapping layer of the data storage node 114, to map extents of volumes (e.g., VVOLs) to corresponding redundant array of independent (or inexpensive) disk (RAID) addresses, which, in turn, can be mapped to corresponding drive locations in an underlying storage drive array 116. The storage drive array 116 can include a plurality of storage drives 124.1, 124.2, 124.3, ..., 124.k (referred to herein as the "physical drives"), such as magnetic disk drives, electronic flash drives, optical drives, and/or any other suitable physical drives. The storage drive array 116 may be locally attached to an JO channel of the data storage node 114, while also being accessible over the network 108.

The RAID manager 127 can be configured, in a RAID management layer of the data storage node 114, to reconstruct metadata that may have been lost due to the failure of one or more physical drives of the storage drive array 116, or become erroneous and/or inconsistent due to one or more software failures. Operation of the RAID manager 127 will be further described herein with reference to an illustrative example of the disclosed techniques for providing metadata (and/or data) protection in a data storage system.

The services library 128 can be configured to implement a library of service routines that can be invoked for servicing storage IO requests (e.g., write requests, read requests) at the data storage node 114. In one embodiment, the services library 128 can be implemented as a RAID library. Further, the storage processing circuitry 120 can execute application programming interface (API) calls to the services library 128 for writing and/or reading data and/or metadata to/from the respective physical drives 124.1, ..., 124.k. In connection with certain processing flows (e.g., IO processing flows, merger processing flows, rebuild processing flows), the storage processing circuitry 120 can obtain appropriate parameters for executing the API calls to the services library 128. For example, such parameters for the API calls may be used to specify IO operations to write (or read) metadata (or data) to (or from) fixed (or variable) addresses of storage objects on the respective physical drives 124.1, ..., 124.k of the storage drive array 116.

In one embodiment, the storage drive array 116 can be implemented as a dual-ported drive, which can be shared among the data storage node (primary) 114.1 and the data storage node (secondary) 114.2 of the data storage appliance 104. Further, in one embodiment, the storage processing circuitry 120 can include one or more physical storage processors or engines (running specialized software), data movers, director boards, blades, IO modules, storage drive controllers, switches, and/or any other suitable computer hardware or combination thereof. For example, the storage processing circuitry 120 may process storage IO requests (e.g., write requests, read requests) provided by the respective host computers 102.1, . . . , 102.n over the communications medium 103, and store host data in a RAID environment implemented by the storage drive array 116.

In the context of the storage processing circuitry 120 being implemented using one or more processors running specialized software, a computer program product can be configured to deliver all or a portion of the software constructs to the respective processor(s). Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. The non-transient computer-readable storage media can be encoded with sets of instructions that, when executed by the respective processor(s), perform the techniques disclosed herein.

During operation, the data storage appliance 104 can provide metadata (and/or data) protection in the clustered storage environment 100, while reducing storage utilization and therefore write amplification in the data storage appliance's physical drives. The data storage appliance 104 can store, for a specific data page, two (2) instances of a main metadata (MMD) page and one (1) instance of a corresponding alternative metadata (AMD) page in a protected storage object referred to herein as the "2+1-way mirror" (see FIG. 1d, reference numeral 130) of the storage drive array 116. The 2+1-way mirror 130 can effectively provide 3-way mirroring of each MMD page, allowing protection against metadata loss due to the concurrent failure of two (2) physical drives. Further, the 2+1-way mirror 130 can maintain each AMD page logically independent of each instance of its corresponding MMD page, allowing protection against catastrophic errors and/or inconsistencies in each MMD page due to software failures.

FIG. 1d depicts an illustrative embodiment of the 2+1-way mirror 130, which can be implemented in the storage drive array 116 attached to the data storage node 114. As shown in FIG. 1d, the 2+1-way mirror 130 can include multiple physical drives, including, for example, at least three (3) different and distinct physical drives of the storage drive array 116, such as a first drive corresponding to the storage drive 124.1, a second drive corresponding to the storage drive 124.2, and a third drive corresponding to the storage drive 124.3. For example, for a specific data page, a first instance of a main metadata (MMD) page can be stored on the first drive 124.1, and a second instance of the MMD page can be stored on the second drive 124.2 such that the first and second drives 124.1, 124.2 each have a mirrored copy of the same MMD page. Further, an instance of a corresponding alternative metadata (AMD) page can be stored on the third drive 124.3 such that the AMD page is logically independent of each mirrored copy of the MMD page on the first and second drives 124.1, 124.2. For example, the metadata stored on each of the MMD page and the corresponding AMD page may correspond to Mode metadata, system configuration metadata, metadata for logical structures such as provisioned devices, RAID groups, logical unit numbers (LUNs), etc., and/or any other suitable metadata.

In one embodiment, the alternative metadata (AMD) page stored on the third drive 124.3 of the 2+1-way mirror 130 can correspond to a non-redundant metadata page that lags behind its corresponding main metadata (MMD) page by a specified time interval. Further, any changes made to the metadata of the MMD page during the specified time interval can be maintained in a respective delta-log among one or more delta-logs 132 (see FIG. 1d), such that the respective delta-log can be periodically merged with the AMD page to obtain an effective logical equivalent of its corresponding MMD page and subsequently freed. For example, each of the delta-logs 132 may be implemented as a data file, a storage area allocated on a physical drive (such as a physical drive of the 2+1-way mirror 130, or another physical drive separate from the 2+1-way mirror 130), a persistent memory area of the memory 122, or any other suitable implementation. Further, the data storage node 114 may perform such merging of the respective delta-log with the AMD page using a software construct such as the upper layer plug-in 133, or any other suitable software and/or hardware technique.

Moreover, in the event the main metadata (MMD) page becomes lost or corrupted (e.g., due to a software failure), the data storage node 114 can merge the metadata changes maintained in the respective delta-log with the alternative metadata (AMD) page on the third drive 124.3 to reconstruct the MMD page. For example, if metadata of the MMD page appears to be consistent at the RAID management layer when the metadata is read from the first drive 124.1 (or the second drive 124.2) of the 2+1-way mirror 130, but appears to be inconsistent at the mapping layer, then the data storage node 114 may call the upper layer plug-in 133 to merge the metadata changes maintained in the respective delta-log with the AMD page, thereby obtaining an effective logical equivalent of the MMD page (presumably having no errors or inconsistencies). The MMD page obtained by merging the metadata changes maintained in the respective delta-log with the AMD page may then be copied to the first drive 124.1, the second drive 124.2, and/or the third drive 124.3 of the 2+1-way mirror 130.

The disclosed techniques for providing metadata (and/or data) protection in a data storage system will be further understood with reference to the following illustrative example, as well as FIGS. 1a-1d. In this example, the ("first") storage drive 124.1, the ("second") storage drive 124.2, and the ("third") storage drive 124.3 of the storage drive array 116 (see FIG. 1c) are included in the 2+1-way mirror 130 (see FIG. 1d). Further, for a specific data page, the first drive 124.1 is configured to store a first instance of a main metadata (MMD) page, the second drive 124.2 is configured to store a second instance (e.g., a mirrored copy) of the MMD page, and the third drive 124.3 is configured to store an instance of an alternative metadata (AMD) page, which lags behind its corresponding MMD page by a specified time interval. It is noted that the first and second instances of the MMD page on the first and second drives 124.1, 124.2, respectively, and the corresponding AMD page on the third drive 124.3, can each be initialized with the same predetermined data pattern (e.g., all zeros, all ones).

In this example, the data storage appliance 104 (see FIG. 1b) receives a storage IO request, namely, a write request, from one of the host computers 102.1, . . . , 102.n (see FIG. 1a) over the network 108. For example, the write request may specify the data page to be written to a data volume stored on at least one physical drive 124.4, 124.5, . . . , 124.k of the storage drive array 116. The storage processing circuitry 120 of the data storage node 114 services the write request in an JO processing flow, writing the specific data page to the data volume on the storage drive array 116. In this example, such servicing of a write request by the storage processing circuitry 120 includes writing (or updating) a page of metadata (e.g., inode metadata) of the data volume. To that end, the storage processing circuitry 120 executes an API call to the services library (e.g., the RAID library) 128 to invoke a first service routine for performing a metadata write operation to the 2+1-way mirror 130. For example, invoking the first service routine may involve performing, in the JO processing flow, a first metadata write operation for (i) writing (or updating) the first instance of the MMD page to the first drive 124.1 of the 2+1-way mirror 130, and (ii) writing (or updating) the second instance of the MMD page to the second drive 124.2 of the 2+1-way mirror 130. Having performed the first metadata write operation, any changes from a previous version of the MMD page are written, stored, or otherwise maintained in a respective delta-log among the delta-log(s) 132.

As described herein, metadata changes maintained in the respective delta-log can be periodically merged with the alternative metadata (AMD) page stored on the third drive 124.3 to obtain an effective logical equivalent of the main metadata (MMD) page stored on the respective first and second drives 124.1, 124.2 and subsequently freed. In this example, the storage processing circuitry 120 performs such periodic merging of the respective delta-log with the AMD page by calling the upper layer plug-in 133, in a merger processing flow, to obtain the effective logical equivalent of the MMD page. Further, the storage processing circuitry 120 executes another API call to the services library 128 to invoke a second service routine for performing, in the merger processing flow, a second metadata write operation to write (or update) the obtained MMD page to the AMD page on the third drive 124.3 of the 2+1-way mirror 130.

It is noted that the storage processing circuitry 120 can execute additional API calls to the services library 128 to invoke several service routines for performing metadata read operations from the 2+1-way mirror 130. For example, invoking one such service routine may involve performing, in an JO processing flow, a first metadata read operation to read the main metadata (MMD) page on the first drive 124.1 or the second drive 124.2 of the 2+1-way mirror 130. Further, invoking another such service routine may involve performing, in a merger processing flow or a rebuild processing flow, a second metadata read operation to read the alternative metadata (AMD) page on the third drive 124.3 of the 2+1-way mirror 130.

In this example, the data storage appliance 104 operates to effectively recover the first drive 124.1, the second drive 124.2, and/or the third drive 124.3 of the 2+1-way mirror 130, in response to several logically different types of physical drive failures. For example, a first type of physical drive failure may involve the failure of the first drive 124.1 or the second drive 124.2 of the 2+1-way mirror 130. As described herein, for the specific data page, the first drive 124.1 stores the first instance of the main metadata (MMD) page, and the second drive 124.2 stores the second instance (e.g., a mirrored copy) of the MMD page. Such a failure of the first drive 124.1 or the second drive 124.2 can therefore result in the loss of a stored instance of the MMD page. In response to the failure of the first drive 124.1 or the second drive 124.2 of the 2+1-way mirror 130, the RAID manager 127 in the RAID management layer copies, in a rebuild processing flow, the MMD page on the first or second drive 124.1, 124.2 that is still active to a new physical drive location. For example, the MMD page on the active first or second drive 124.1, 124.2 may be copied to an appropriate location on a physical drive 124.4 of the storage drive array 116, or any other suitable physical drive. Having copied the main metadata (MMD) page to the physical drive 124.4 of the storage drive array 116, the physical drive 124.4 may be assigned to function as the new first or second drive of the 2+1-way mirror 130, as appropriate, and the failed first or second drive 124.1, 124.2 may be taken out of service and/or replaced.

Further, a second type of physical drive failure may involve the failure of the third drive 124.3 of the 2+1-way mirror 130, while both the first drive 124.1 and the second drive 124.2 of the 2+1-way mirror 130 remain active. As described herein, for the specific data page, the third drive 124.3 stores an instance of the alternative metadata (AMD) page. Such a failure of the third drive 124.3 can therefore result in the loss of the stored instance of the AMD page. In response to the failure of the third drive 124.3 of the 2+1-way mirror 130, the RAID manager 127 in the RAID management layer copies, in a rebuild processing flow, the main metadata (MMD) page (corresponding to the AMD page) on the first or second drive 124.1, 124.2 to a new physical drive location. For example, the MMD page on the first drive 124.1 (or the second drive 124.2) may be copied to an appropriate location on a physical drive 124.5 of the storage drive array 116, or any other suitable physical drive. Having copied the MMD page to the physical drive 124.5 of the storage drive array 116, the physical drive 124.5 may be assigned to function as the new third drive of the 2+1-way mirror 130, and the failed third drive 124.3 may be taken out of service and/or replaced. In addition, the RAID manager 127 in the RAID management layer notifies the mapping manager 126 in the mapping layer that the metadata page (i.e., the new AMD page) stored on the new third drive 124.5 is identical to the MMD page currently stored on the first drive 124.1. In other words, at the time the new AMD page is copied to the new third drive 124.5, no time lag exists between the new AMD page on the new third drive 124.5 and the MMD page on the first drive 124.1.

Still further, a third type of physical drive failure may involve the concurrent failures of the first drive 124.1 and the second drive 124.2 of the 2+1-way mirror 130, while the third drive 124.3 remains active. As described herein, for the specific data page, the first drive 124.1 stores the first instance of the main metadata (MMD) page, and the second drive 124.2 stores the second instance (e.g., a mirrored copy) of the MMD page. Such concurrent failures of the first drive 124.1 and the second drive 124.2 can therefore result in the loss of all stored instances of the MMD page. In response to the concurrent failures of the first and second drives 124.1, 124.2 of the 2+1-way mirror 130, the storage processing circuitry 120 calls the upper layer plug-in 133 to merge, in a merger processing flow, a respective delta-log among the delta-logs 132 with the alternative metadata (AMD) page on the third drive 124.3 to obtain a new MMD page, and writes the new MMD page to two (2) new physical drive locations. For example, the new MMD page may be written to an appropriate location on each of a physical drive 124.6 and a physical drive 124.7 of the storage drive array 116, or any other suitable physical drives. Having written the new MMD page to the physical drives 124.6, 124.7 of the storage drive array 116, the physical drive 124.6 may be assigned to function as the new first drive of the 2+1-way mirror 130, the physical drive 124.7 may be assigned to function as the new second drive of the 2+1-way mirror 130, and the failed first and second drives 124.1, 124.2 may be taken out of service and/or replaced.

Yet further, a fourth type of physical drive failure may involve the concurrent failures of the first drive 124.1 (or the second drive 124.2) and the third drive 124.3 of the 2+1-way mirror 130. As described herein, for the specific data page, the first drive 124.1 and the second drive 124.2 store the first instance and the second instance, respectively, (e.g., mirrored copies) of the main metadata (MMD) page, and the third drive 124.3 stores the instance of the alternative metadata (AMD) page. Such concurrent failures of the first drive 124.1 (or the second drive 124.2) and the third drive 124.3 can therefore result in the loss of one stored instance of the MMD page, as well as the loss of the stored instance of the AMD page. In response to the concurrent failures of the first drive 124.1 (or the second drive 124.2) and the third drive 124.3 of the 2+1-way mirror 130, the RAID manager 127 in the RAID management layer copies, in a rebuild processing flow, the MMD page on the first or second drive 124.1, 124.2 that is still active to two (2) new physical drive locations. For example, the MMD page on the active first or second drive 124.1, 124.2 may be copied to an appropriate location on each of a physical drive 124.8 and a physical drive 124.9 of the storage drive array 116, or any other suitable physical drives. Having copied the MMD page to the physical drives 124.8, 124.9 of the storage drive array 116, the physical drive 124.8 may be assigned to function as the new first or second drive of the 2+1-way mirror 130, as appropriate, the physical drive 124.9 may be assigned to function as the new third drive of the 2+1-way mirror 130, and the failed first drive 124.1 or second drive 124.2 and the failed third drive 124.3 may be taken out of service and/or replaced. In addition, the RAID manager 127 in the RAID management layer notifies the mapping manager 126 in the mapping layer that the metadata page (i.e., the new AMD page) stored on the new third drive 124.9 is identical to the MMD page currently stored on the active first or second drive 124.1, 124.2. In other words, at the time the new AMD page is copied to the new third drive 124.9, no time lag exists between the new AMD page on the new third drive 124.9 and the MMD page on the active first or second drive 124.1, 124.2.

Figure 2:
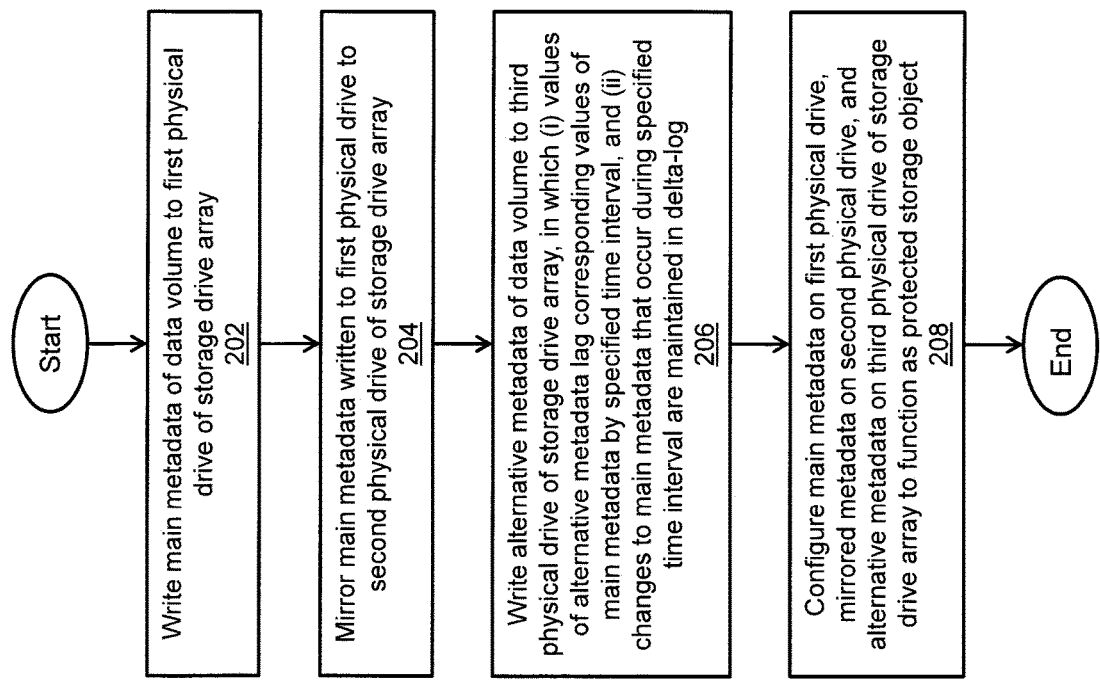
FIG. 2 is a flow diagram of an exemplary method of providing metadata (and/or data) protection in a data storage system.

An exemplary method of providing metadata (and/or data) protection in a data storage system is described below with reference to FIG. 2. As depicted in block 202, main metadata of a data volume are written to a first physical drive of a storage drive array. As depicted in block 204, the main metadata written to the first physical drive are mirrored to a second physical drive of the storage drive array. As depicted in block 206, alternative metadata of the data volume are written to a third physical drive of the storage drive array, in which (i) values of the alternative metadata lag corresponding values of the main metadata by a specified time interval, and (ii) changes to the main metadata that occur during the specified time interval are maintained in a delta-log. As depicted in block 208, main metadata on the first physical drive, the mirrored metadata on the second physical drive, and the alternative metadata on the third physical drive of the storage drive array are configured to function as a protected storage object.

Having described the foregoing illustrative embodiments, other embodiments and/or variations may be made and/or practiced. For example, it was described herein that the data storage appliance 104 (see FIG. 1b) could store, for a specific data page, two (2) instances of a main metadata (MMD) page and one (1) instance of a corresponding alternative metadata (AMD) page in a protected storage object referred to herein as the 2+1-way mirror 130 (see FIG. 1d). In an alternative embodiment, the 2+1-way mirror 130 can be configured and arranged as a storage tier (e.g., a RAID tier) associated with a data storage appliance. Such a storage tier can include physical storage drives or devices having one or more attributes associated with a definition for the storage tier. For example, such a definition may be based on a set of attributes, which may include one or more of (i) a storage type or technology, (ii) a type of metadata (or data) protection, (iii) storage device performance characteristics, (iv) storage capacity, and so on. The storage type or technology may specify whether a physical storage drive is an SSD or a non-SSD, a particular type of SSD (e.g., flash, a form of RAM), and/or a particular type of non-SSD (e.g., a fiber channel (FC) disk drive, a serial advanced technology attachment (SATA) drive, a serial-attached SCSI drive, a nearline SAS (NL-SAS) drive). The type of metadata (or data) protection may specify a level of metadata (or data) storage protection such as a particular RAID level (e.g., RAID-5, RAID-6). The device performance characteristics may relate to different performance aspects of the physical storage drives of a particular type or technology. The storage capacity may specify an amount of metadata (or data) (e.g., in bytes) that may be stored on the respective physical storage drives.

While various embodiments of the disclosure have been particularly shown and described, it will be understood by those skilled in the art that various changes in form and/or details may be made herein without departing from the scope of the disclosure, as defined by the appended claims.

What is claimed is:

1. A method of providing metadata protection in a data storage system, comprising:
    writing a first instance of a main metadata page of a data volume to a first physical drive of a storage drive array;
    writing a second instance of the main metadata page to a second physical drive of the storage drive array;
    writing an instance of an alternative metadata page of the data volume to a third physical drive of the storage drive array, wherein (i) values of the alternative metadata page lag corresponding values of the main metadata page by a specified time interval, and (ii) changes to the main metadata page that occur during the specified time interval are maintained in a delta-log;
    in response to concurrent failures of the first physical drive and the second physical drive, merging the changes to the main metadata page maintained in the delta-log with the alternative metadata page on the third physical drive to obtain a logical equivalent of the main metadata page; and
    writing the logical equivalent of the main metadata page to each of a fourth physical drive and a fifth physical drive of the storage drive array.

2. The method of claim 1 further comprising:
    servicing a write request to write a specified data page to the data volume,
    wherein the servicing of the write request includes writing the first instance of the main metadata page to the first physical drive, and writing the second instance of the main metadata page to the second physical drive.

3. The method of claim 1 further comprising:
    periodically merging the changes to the main metadata page maintained in the delta-log with the alternative metadata page on the third physical drive to obtain the logical equivalent of the main metadata page.

4. The method of claim 3 further comprising:
updating the instance of the alternative metadata page on the third physical drive using the logical equivalent of the main metadata page.

5. The method of claim 1 further comprising:
in response to a failure of a respective physical drive among the first physical drive and the second physical drive, copying the main metadata page on an active physical drive among the first physical drive and the second physical drive to the fourth physical drive of the storage drive array; and
assigning the fourth physical drive to function as the respective physical drive that has the failure.

6. The method of claim 1 further comprising:
in response to a failure of the third physical drive, copying the main metadata page on one of the first physical drive and the second physical drive to the fourth physical drive of the storage drive array; and
assigning the fourth physical drive to function as the third physical drive.

7. The method of claim 6 further comprising:
notifying a mapping layer of the data storage system that the copied main metadata page on the fourth physical drive is identical to the main metadata page on the first physical drive.

8. The method of claim 1 further comprising:
assigning the fourth physical drive and the fifth physical drive to function as the first physical drive and the second physical drive, respectively.

9. The method of claim 1 further comprising:
in response to an error or inconsistency in the main metadata page on one or more of the first physical drive and the second physical drive, merging the changes to the main metadata page maintained in the delta-log with the alternative metadata page on the third physical drive to obtain the logical equivalent of the main metadata page; and
reconstructing the main metadata page having the error or inconsistency using the logical equivalent of the main metadata page.

10. A method of providing metadata protection in a data storage system, comprising:
writing a first instance of a main metadata page of a data volume to a first physical drive of a storage drive array;
writing a second instance of the main metadata page to a second physical drive of the storage drive array;
writing an instance of an alternative metadata page of the data volume to a third physical drive of the storage drive array, wherein (i) values of the alternative metadata page lag corresponding values of the main metadata page by a specified time interval, and (ii) changes to the main metadata page that occur during the specified time interval are maintained in a delta-log;
in response to concurrent failures of (i) a respective physical drive among the first physical drive and the second physical drive, and (ii) the third physical drive, copying the main metadata page on an active physical drive among the first physical drive and the second physical drive to each of a fourth physical drive and a fifth physical drive of the storage drive array;
assigning the fourth physical drive to function as the respective physical drive that has the failure; and
assigning the fifth physical drive to function as the third physical drive.

11. The method of claim 10 further comprising:
notifying a mapping layer of the data storage system that the copied main metadata page on the fifth physical drive is identical to the main metadata page on the active physical drive among the first and second physical drives.

12. A data storage system, comprising:
a 2+1 way mirror including at least a first physical drive, a second physical drive, and a third physical drive of a storage drive array,
wherein the first physical drive is configured to store a first instance of a main metadata page of a data volume,
wherein the second physical drive is configured to store a second instance of the main metadata page of the data volume,
wherein the third physical drive is configured to store an instance of an alternative metadata page of the data volume, and
wherein values of the alternative metadata page lag corresponding values of the main metadata page by a specified time interval, and changes to the main metadata page that occur during the specified time interval are maintained in a delta-log;
a memory; and
processing circuitry configured to execute program instructions out of the memory:
in response to concurrent failures of the first physical drive and the second physical drive, to merge the changes to the main metadata page maintained in the delta-log with the alternative metadata page on the third physical drive to obtain a logical equivalent of the main metadata page; and
to write the logical equivalent of the main metadata page to each of a fourth physical drive and a fifth physical drive of the storage drive array.

13. The data storage system of claim 12 wherein the first physical drive, the second physical drive, and the third physical drive correspond to three (3) different and distinct physical drives of the storage drive array.

14. The data storage system of claim 12 wherein the instance of the alternative metadata page stored on the third physical drive is logically independent of each of the first instance of the main metadata page stored on the first physical drive and the second instance of the main metadata page stored on the second physical drive.

15. A computer program product including a set of non-transitory, computer-readable media having instructions that, when executed by control circuitry of a computerized apparatus, cause the control circuitry to perform a method of providing metadata protection in a data storage system, the method comprising:
writing a first instance of a main metadata page of a data volume to a first physical drive of a storage drive array;
writing a second instance of the main metadata page to a second physical drive of the storage drive array;
writing an instance of an alternative metadata page of the data volume to a third physical drive of the storage drive array, wherein (i) values of the alternative metadata page lag corresponding values of the main metadata page by a specified time interval, and (ii) changes to the main metadata page that occur during the specified time interval are maintained in a delta-log;
in response to concurrent failures of the first physical drive and the second physical drive, merging the changes to the main metadata page maintained in the delta-log with the alternative metadata page on the third physical drive to obtain a logical equivalent of the main metadata page;

writing the logical equivalent of the main metadata page to each of a fourth physical drive and a fifth physical drive of the storage drive array; and assigning the fourth physical drive and the fifth physical drive to function as the first physical drive and the second physical drive, respectively.

16. The computer program product of claim 15, wherein the method further comprises: in response to a failure of a respective physical drive among the first physical drive and the second physical drive, copying the main metadata page on an active physical drive among the first physical drive and the second physical drive to the fourth physical drive of the storage drive array; and assigning the fourth physical drive to function as the respective physical drive that has the failure.

17. The computer program product of claim 15, wherein the method further comprises:

in response to a failure of the third physical drive, copying the main metadata page on one of the first physical drive and the second physical drive to the fourth physical drive of the storage drive array; and assigning the fourth physical drive to function as the third physical drive.

18. A computer program product including a set of non-transitory, computer-readable media having instructions that, when executed by control circuitry of a computerized apparatus, cause the control circuitry to perform a method of providing metadata protection in a data storage system, the method comprising:

writing a first instance of a main metadata page of a data volume to a first physical drive of a storage drive array;

writing a second instance of the main metadata page to a second physical drive of the storage drive array;

writing an instance of an alternative metadata page of the data volume to a third physical drive of the storage drive array, wherein (i) values of the alternative metadata page lag corresponding values of the main metadata page by a specified time interval, and (ii) changes to the main metadata page that occur during the specified time interval are maintained in a delta-log;

in response to concurrent failures of (i) a respective physical drive among the first physical drive and the second physical drive, and (ii) the third physical drive, copying the main metadata page on an active physical drive among the first physical drive and the second physical drive to each of a fourth physical drive and a fifth physical drive of the storage drive array;

assigning the fourth physical drive to function as the respective physical drive that has the failure; and assigning the fifth physical drive to function as the third physical drive.

* * * * *